United States Patent [19]

van der Lely

[11] 4,409,657

[45] Oct. 11, 1983

[54] TIME CLOCK FOR RECORDING THE IDENTIFICATION OF A PERSON

[76] Inventor: Cornelis van der Lely, 7 Brüschenrain, Zug, Switzerland

[21] Appl. No.: 260,381

[22] Filed: May 4, 1981

[30] Foreign Application Priority Data

May 20, 1980 [NL] Netherlands ................. 8002895

[51] Int. Cl.³ .................. G06F 15/21; G07C 1/00
[52] U.S. Cl. ......................... 364/401; 235/377; 364/406; 377/20
[58] Field of Search ............ 364/401, 406, 467, 569; 235/377, 378, 425, 92 AC, 92 T; 368/107, 109, 244, 274; 377/20

[56] References Cited

U.S. PATENT DOCUMENTS

| | | | |
|---|---|---|---|
| 3,351,912 | 11/1967 | Collom et al. | 364/406 X |
| 3,593,008 | 7/1971 | De Witt et al. | 364/401 |
| 3,648,243 | 3/1972 | Wiggins | 364/406 X |
| 3,660,645 | 5/1972 | Lecht et al. | 364/401 X |
| 4,107,663 | 8/1978 | Morimoto et al. | 364/855 X |
| 4,195,220 | 3/1980 | Bristol et al. | 235/92 T |
| 4,323,771 | 4/1982 | Chalker, Jr. et al. | 235/377 |

FOREIGN PATENT DOCUMENTS

| | | |
|---|---|---|
| 1117728 | 6/1968 | United Kingdom . |
| 1131436 | 10/1968 | United Kingdom . |
| 1284462 | 8/1972 | United Kingdom . |
| 1325705 | 8/1973 | United Kingdom . |
| 1329558 | 9/1973 | United Kingdom . |
| 1449523 | 9/1976 | United Kingdom . |
| 2052123 | 1/1981 | United Kingdom . |

OTHER PUBLICATIONS

J. Gallacher, "Improved Production Methods Flow From Up-to-Date Data", *Control & Instrumentation,* Jul./Aug. 1974, pp. 40-43.

*Primary Examiner*—Jerry Smith
*Attorney, Agent, or Firm*—Penrose, Lucas, Albright, Mason, Mason & Albright

[57] ABSTRACT

A time clock and/or computer system has a central management office with readout communication to factory work stations. Work instructions to the work stations are displayed for the foreman who prints or punches a working order. The order together with worker ID are fed to a time clock at the station before and after the job. Signals to a terminal at the station indicate delays to the foreman and management.

21 Claims, 4 Drawing Figures

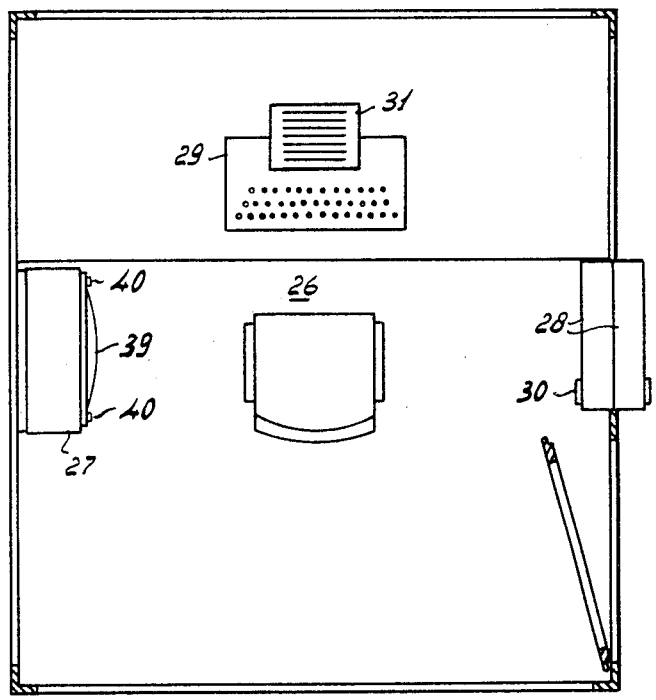
FIG. 2
FIG. 4
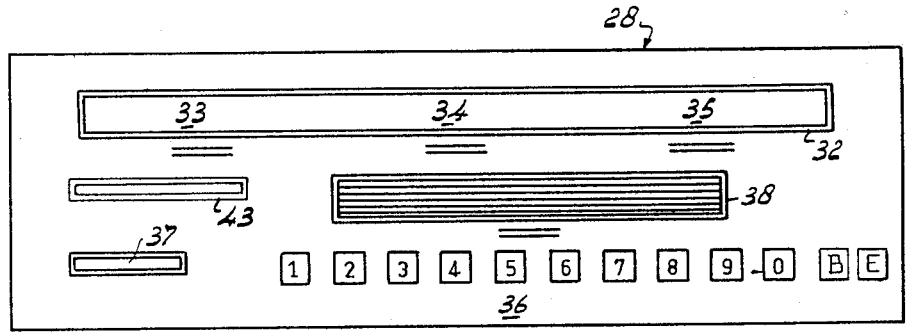

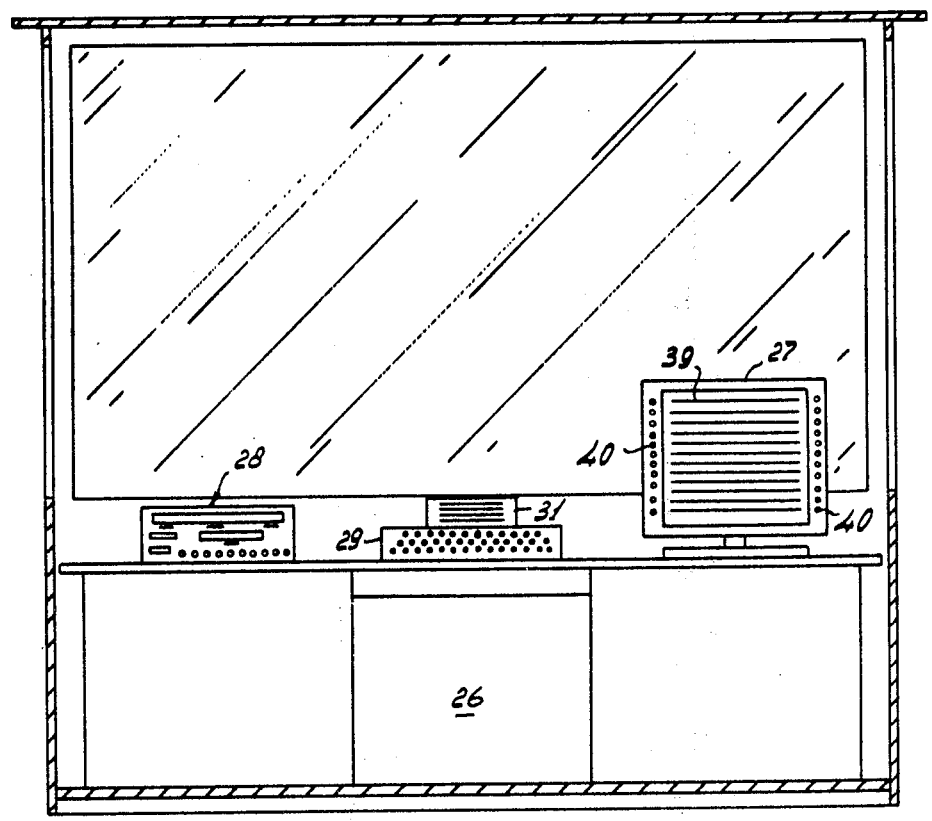

4,409,657

TIME CLOCK FOR RECORDING THE IDENTIFICATION OF A PERSON

SUMMARY OF THE INVENTION

The invention relates to a time clock for recording the indentification of a person.

An objective of the invention is to maximize efficiency.

According to the invention the time clock comprises also means for recording a working order preferably by a card or badge identifying the working order.

For a better understanding of the invention and to show how the same can be carried into effect, reference will be made, by way of example, to the accompanying drawing.

BRIEF DESCRIPTION OF THE DRAWINGS

FIG. 2 is a plan view of a work station where the time clock is used.

FIG. 3 is a horizontal view of a second embodiment of a work station.

FIG. 4 is a front view of a time clock.

DESCRIPTION OF THE PREFERRED EMBODIMENT

Figure 1:
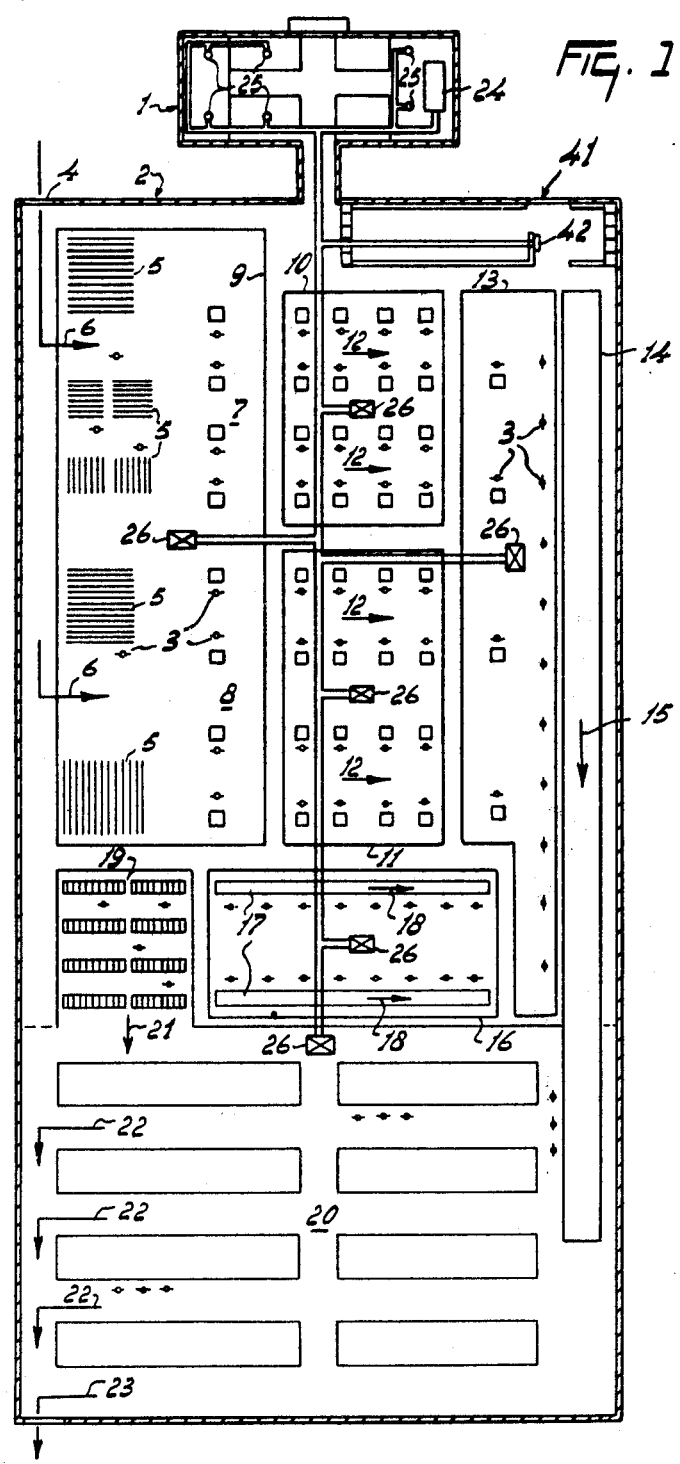
FIG. 1 is a schematic plan view of a factory in which the invention may be applied.

The plan shown in FIG. 1 is that of an office building 1 and a factory building 2. The operations to be carried out in the factory building 2 relate, at least in this embodiment, to the manufacturing of products, such as machines by the labor force 3, whereby component parts are made from raw material.

The raw material enters at an entrance designated by reference numeral 4 into the building 2 and is stored in areas indicated by reference numeral 5. Viewed in the direction of the arrows 6 machines are arranged near the storage areas 5 for preparing the raw material, such as the cutting machines 7 and the brake presses 8. The handling of the raw material at 5, 7 and 8 is in a single department indicated in FIG. 1 by the boundary line 9. The parts manufactured in the department 9 are transported in a direction corresponding to the arrows 6, arriving at departments 10 and 11, department 10 in this case being a welding section and department 11 a milling section. The component parts manufactured in departments 10 and 11 are transported in the direction of the arrows 12 towards an assembling department 13, where the component parts are further treated and subsequently passed onto an assembly line 14, on which the products are assembled during the movement of the line in the direction of the arrow 15. Near the milling department 11 a subassembly section 16 is provided with assembly lines 17 on which component parts consisting of smaller, individual units are assembled. These units are moved in the direction of the arrows 18 on the lines 17 and supplied to the assembly line 14. At reference numeral 19 a storage for finished parts (for example products manufactured by suppliers) is provided.

At the end of the assembly line 14 the finished products are moved off the line and stored in a warehouse 20. In the warehouse 20 parts supplied in the direction of the arrow 21 from the section 19 can be added to the products.

The warehouse 20 may contain a buffer stock of finished products, the delivery of which depends, for example, on the season.

The finished products leave the factory 2 in the direction of the arrows 22 through an exit 23.

The operations to be carried out in the factory building 2 are instructed by the management 25 from the factory office 1. The instructions are such that with a maximum of efficiency the inventory of raw materials and of work process will be as low as possible. The operations and the time within which these operations will have to be performed are processed by a main computer 24 in the office building 1.

The departments of the factory 2 comprise, as shown in FIGS. 2 and 3, a work station 26. The equipment in said work station is connected by appropriate electronic circuits with the main computer 24. The equipment in the work station comprises a terminal 27, a time clock 28, a keyboard 29, a printer 31.

The display screen 39 provides working orders supplied by the management office. A working order can be printed by the printer 31. A working order can also be produced by a punch card system. The terminal 27 is preferably provided with signals 40, consisting of lights which start flashing when a job is not finished on time. If the job is very much delayed red lights will be flashing. If the job is less delayed green lights will be operative. A foreman in the work station 26 can operate the time clock from the inside of the work station through a slot 30. The time clock 28 will record the exact starting and terminating time of the working order and the exact time of finalizing the job.

FIG. 4 comprises a front view of a time clock 28. Preferably the means shown on the front view of the time clock 28 are located outside the work station 26, however these means can also be inside the work station or on both sides of the time clock. This time clock comprises a display 32 showing at 33 the time worked on the job and at 34 the time that was planned for the job and at 35 the time worked that day on the job. By inserting an identification card of a workman such data will be displayed whereby the time clock 28 may also comprise a speaker 38 saying, e.g. if the job is finished on time, "Excellent". The time clock 28 is provided with the slot 37 for inserting the workman's identification card and the slot 43 for inserting a working order card. Also the buttons 36 can be used for recording the working order number. Some of these buttons (B,E) can also be used for recording the beginning time and the finishing time of the job.

The factory has an entrance 41 and a time clock 42 for the labor force entering or leaving the factory. For the registration of their daily working time this time clock 42 is used whereby also this time clock can be provided with means for producing expressions, such as vocal sounds, e.g. if the factory begins at 7.30 and if the workman arrives before 7.30, the time clock will then when he inserts his badge indicate e.g.: "Good morning" by saying this or by displaying this on the display 33, 34, 35.

With the time clock 28 located at the work station 26 the time of a person working on a job can be recorded. This is advantageous for the purpose of recording piece work and for calculating the corresponding wages.

The time clock system described is particular of interest to factories where the labor force makes a number of parts on one day and different parts on another day and thereafter such parts will be assembled to products. The main computer will calculate the shortest working time possible, however, the time clock system will create the maximum efficiency as with the time clocks and the identification of the working orders fed into the time clocks the maximum efficiency will be obtained in a reliable and rapid manner. With the time clock system it will be possible to reduce the work in process and the inventory. Therefore the productivity of the factory will be increased. If the management in the office decides to manufacture e.g. 1000 products of a certain type in one month and e.g. 2000 other types of products in another month this information will be fed into the computer by the work planning department in the office, resulting in working orders on the displays in the foremen's stations 26. The foreman then produces with the printer or with punch card equipment the working order. The person performing the working next order puts his identification badge into the time clock together with the working order thereby recording the time he starts on the job. If the system does not include printed or punched working orders, the workman can use the keyboard 36 on the time clock for recording the working order number. When the person finishes the working order he will also insert his identification card together with the working order card into the time clock thereby recording the end or finishing time of the job.

If the job described on the working order will be delayed the indication lights 40 on the terminal 27 will start flashing a red light when the job is very much delayed and e.g. a green light when the job is less delayed. This will give the foreman and/or management an indication which jobs or working orders should get preference over other ones so that there will be no delay in the supply of parts at the assembly line in the factory.

Some of the advantages of the time clock system are:

It will supply management with an exact information how much time each day is worked by a person on a working order. The person performing the job will be known to the computer system.

If another person, because e.g. of illness, must continue the job, he can with his identification card feed the indication into the computer system that he is working on the job.

If the labor force in a factory is on piece work, the wages can easily be calculated.

At the work stations it will be known which job is delayed and steps to improve on it can be taken.

The speaking of the time clocks will give the system a human touch.

A maximum of working efficiency and a minimum of inventory can be maintained.

The invention is not necessarily limited to the disclosure in the description and claims but also may relate to the details of the figures which may not have been described.

Having described my invention, what I claim as new and to be secured by Letters Patent of the United States is:

1. A time clock system for recording and communicating between management and workers, work being performed during time periods, comprising a management office and a plurality of work stations, electronic circuits connecting said office and said work stations for transmitting data between them, said work stations adapted to receive work orders from said management office via said circuits, a time clock at said station, said clock having means that records the work orders and information as to the identification of the worker carrying out said work orders, said clock being positioned to receive said information concerning said worker from card means and record said information.

2. A time clock system as claimed in claim 1, in which said clock has a slot that receives a work order card.

3. A time clock as claimed in claim 2, in which two slots are provided in said time clock for receiving two different cards.

4. A time clock system as claimed in claim 1, wherein said system includes a computer.

5. A time clock system as claimed in claim 4, wherein the computer includes at least one terminal for processing working orders.

6. A time clock system as claimed in claim 5, wherein the computer communicates via said circuit to a device that prints a work order on a sheet of material.

7. A time clock for use in an electronic system that records and communicates information between management and workers, said clock having means that receives card means for worker identification and further means that produces an expression discernible to the worker at least in part in response to receiving said card means, said expression indicating the timeliness said card means is received by said clock and characterizing the worker's job performance.

8. A time clock as claimed in claim 7, wherein the further means expresses a vocal sound.

9. A time clock as claimed in claim 8, wherein the expression is settable until a predetermined starting time.

10. A time clock as claimed in claim 7, wherein the clock is provided with a display for showing data.

11. A time clock as claimed in claim 10, wherein the data discloses the time worked on a job and to the time planned for that job.

12. A time clock system for recording and communicating between management and workers, work being performed during time periods, comprising a time clock and a terminal, said terminal having means producing instructions from said management on a card and said clock comprising recording means that receives said card and records that said instructions are being performed together with a time period to complete said performance, when said performance is completed, and whether or not said performance is completed within said time period.

13. A system as claimed in claim 12, wherein said terminal comprises a printer.

14. A system as claimed in claim 12, wherein the terminal comprises a card punch device.

15. A system as claimed in claim 12, wherein said terminal is adapted to display the card information and associate same with identification light means.

16. A system as claimed in claim 15, wherein the identification light means includes different colored lights.

17. A computer system for communicating and correlating work information and time intervals comprising an office and a work station, an electronic circuit connecting said office to said work station, means for recording work instructions transmitted from said office to said work station in said work station, said recording means comprising at least one time clock that records said work instructions, the planned time to implement said work instructions, the identification of the worker who implements said work instructions and the time it takes said worker to implement said work instructions, said time clock transmitting said latter information to said office via said electronic circuit.

18. A computer system as claimed in claim 17, wherein said system includes a terminal with flashing lights that displays signals responsive to said information.

19. A computer system as claimed in claim 18, wherein said time clock is positioned at a work station and has means for operating same from two different sides of the work station.

20. Apparatus for controlling operations in remote stations from an office comprising: an office, management central control in said office; a plurality of remote stations; an electronic circuit connecting said management central control with said remote stations; a time clock connected to said circuit in each said remote station, said time clock adapted to receive the following information at its corresponding said station (a) the nature of a task to be undertaken in the vicinity of said station, (b) the time when said task is begun, (c) the time when said task is completed, and (d) the identification of the worker who did the task, and to transmit said information to said management central control via said circuit, said management central control adapted to assign tasks to each said station and the time planned for the completion of each said task via said circuit through said time clock.

21. Apparatus in accordance with claim 20, wherein each said time clock comprises signalling means, said signalling means adapted to signal when the period of time planned for said task has been exceeded before its completion.

* * * * *